United States Patent [19]

Smith

[11] Patent Number: 4,905,354

[45] Date of Patent: Mar. 6, 1990

[54] FASTENING DEVICE

[75] Inventor: Brian Smith, London, England

[73] Assignee: Easi-Bind International Ltd., United Kingdom

[21] Appl. No.: 221,705

[22] Filed: Jul. 20, 1988

[30] Foreign Application Priority Data

Jul. 23, 1987 [GB] United Kingdom ............... 8717435

[51] Int. Cl.$^4$ ............................................. F16B 21/00
[52] U.S. Cl. ....................................... 24/590; 24/453; 24/591
[58] Field of Search ................. 24/590, 591, 592, 593, 24/594, 597, 598, 297, 453; 411/554; 403/342

[56] References Cited

U.S. PATENT DOCUMENTS

| | | | |
|---|---|---|---|
| 1,115,489 | 11/1914 | Bennett | 24/591 |
| 2,693,014 | 11/1954 | Monahan | 24/590 |
| 2,758,498 | 8/1956 | Johnson | 24/453 |
| 3,382,546 | 5/1968 | Palmay et al. | 24/453 |
| 4,599,768 | 7/1986 | Doyle et al. | 24/590 |
| 4,653,708 | 3/1987 | Rich | 24/590 |
| 4,677,714 | 7/1987 | Wright | 24/590 |

FOREIGN PATENT DOCUMENTS

| | | | |
|---|---|---|---|
| 1411127 | 8/1965 | France | 24/590 |
| 0019819 | of 1910 | United Kingdom | 24/590 |

Primary Examiner—Victor N. Sakran
Attorney, Agent, or Firm—Jones, Askew & Lunsford

[57] ABSTRACT

A fastening means for attachment to a sheet material, the fastening means comprising a body for location on one side of the sheet material, at least one blade member resiliently attached to the body and being movable relative thereto to define a gap for reception of the sheet material, the at least one blade member being adapted for insertion through a similarly shaped aperture formed in the sheet material so that on rotation of the body sheet material adjacent said aperture enters said gap and is used by the blade member(s) into contact with the body to thereby secure the fastening means to the sheet material.

8 Claims, 4 Drawing Sheets

FASTENING DEVICE

The present invention relates to a fastening device for securing articles to deformable sheet material, in particular card or plastics sheet.

It is desirable to attach articles to deformable sheet material in a quick and convenient manner. For example, with reference to the container disclosed in our European Patent Application 220874A it is desirable for the clasp member to be easily attached by the user on erection of the container.

According to one aspect of the present invention there is provided a fastening means for attachment to a deformable sheet material, the fastening means comprising a relatively rigid body for location on one side of the sheet material, the body having an abutment face for abutment with said one side of the sheet material the abutment face having at least one recess and at least one blade member attached to the body so as to be located above the recess or one of the recesses, the at least one blade member being adapted for insertion through a similarly shaped aperture formed in the sheet material so that, on rotation of the body, sheet material adjacent said aperture enters between the blade member(s) and the body and is urged by the blade member(s) into the recess located therebeneath to cause the sheet material to deform and abut against the abutment face bordering said recess located therebeneath and thereby secure the fastening means to the sheet material. Preferably the body is provided with location means adjacent to said at least one blade member for co-operation with the sheet material to restrain rotation of the body.

Various aspects of the present invention are hereinafter described, with reference to the accompanying drawings, in which.

Figures 1, 2:
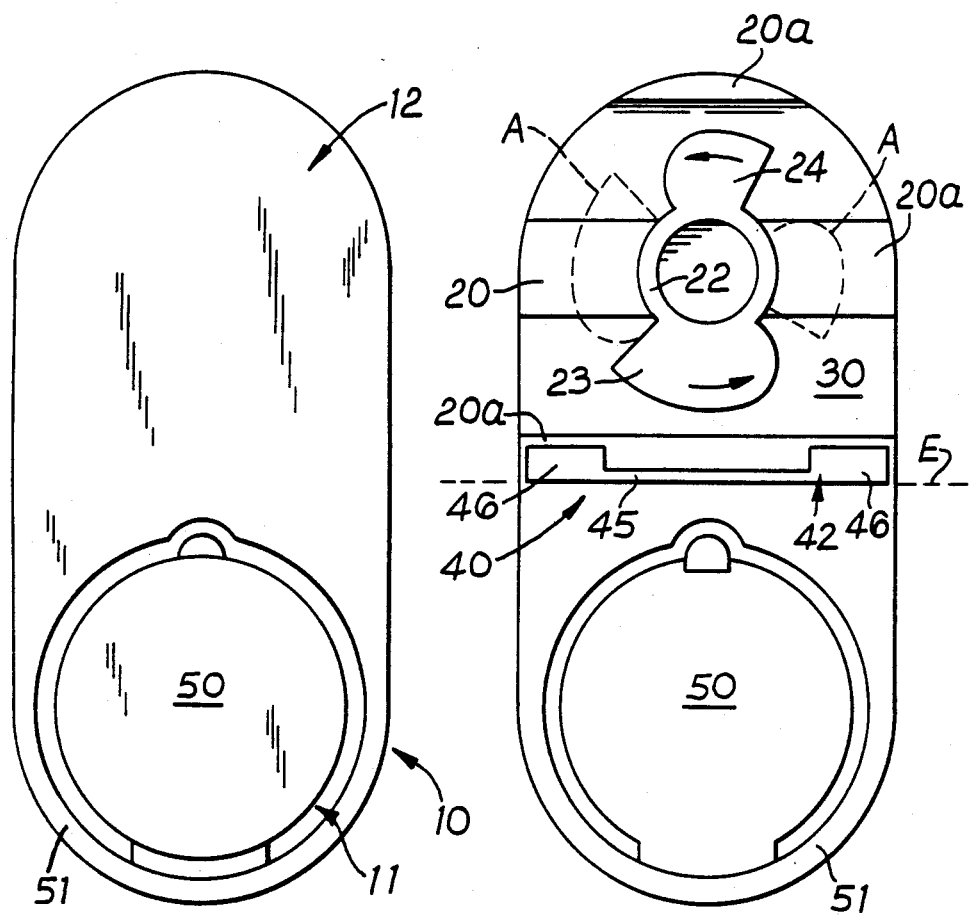
FIG. 1 is a front view of a clasp having a fastening device according to the present invention.
FIG. 2 is a rear view of the device shown in FIG. 1.
Figure 3:
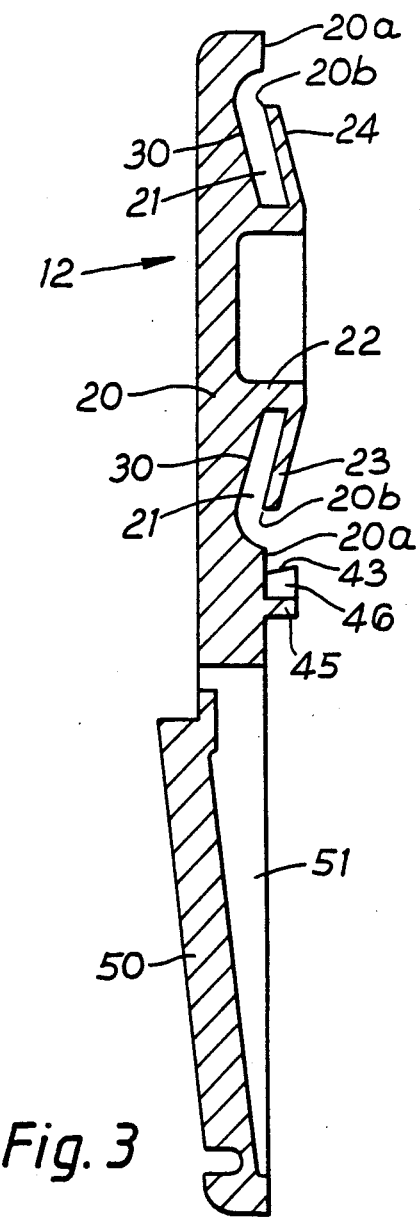
FIG. 3 is a sectional view taken along line III-III in FIG. 2.

Referring initially to FIGS. 1, 2 and 3 there is shown a clasp 10 which is conveniently moulded in one piece from a suitable resilient plastics material, for example polypropylene.

The clasp 10 includes a latch portion 11 which depends from a fastening portion 12. The fastening portion 12 serves to fasten the latch portion 11 to sheet material such as for example the closure flap of the folder described in our European Patent Application 220874A. The sheet material may be any suitable deformable sheet material such as card, plastics sheet, plastics laminated card, etc.

The fastening portion 12 includes a body 20 which is intended to be located on one side of the sheet material SM to which the fastening portion is to be attached. A projection 22 in the form of a shaft extends laterally from one side of the body 20 and a pair of blade members 23, 24 extend radially therefrom.

In the illustrated embodiment, the blade members 23, 24 are inclined toward the body 20 from their point of attachment with the projection 22. Thus the radially outer tip of each blade member 23, 24 is located closer to the body 20 than the root of the blade member. In addition the rear or abutment face 20a of the body 20 which in use abuts against the sheet material is formed with a recess or groove 30 located beneath each blade member 23, 24 such that each blade member 23, 24 acts upon sheet material to urge it into the associated groove. This has the effect of creating localised deformation of the sheet material and ensures a flush fit between the rear face 20a of the body 20 bordering the recess or groove 30 and the sheet material.

In addition such an arrangement enables the fastening portion 12 to be securely attached to a range of sheet material thicknesses. For example, in the illustrated embodiment, the terminal end face 20b of each blade member 23, 24 is located at substantially the same level as the abutment face 20a of the body adjacent to the grooves 30. In this illustrated example sheet thicknesses in the range of 0.4 mm to 1 mm may be accommodated. Thicker sheets, e.g. in the range of 1 mm to 1.6 mm may be accommodated by constructing the fastening portion such that the blade members are spaced further from the body 20 by an appropriate amount.

It is envisaged that the terminal end face 20b may be spaced below the face 20a or may be spaced above face 20a. In the latter case the distance above face 20a would be less than the thickness of the sheet material in order to ensure that the sheet material is urged into the groove.

To attach the fastening portion to the sheet material it is necessary to provide the sheet material with an aperture A which corresponds in outline to the peripheral outline of the blade members 23, 24 and projection 22 as viewed in FIG. 2. The aperture A is shown in broken lines in FIG. 2. The fastening portion is secured to the sheet material by inserting the blade members 23, 24 and projection 22 into the aperture A and then rotating the fastening portion about the axis of the projection 22 (in an anti-clockwise direction in FIG. 2). In the illustrated embodiment, the fastening portion has been rotated through an angle of 90°.

On rotating the fastening portion, the blade members 23, 24 ride onto the rear face of the sheet material so that the material enters the gap 21 between the blade members and the body and urge the engaged portion of the sheet material into the associated groove. In order to facilitate movement of the blade members 23, 24 onto the rear face of the sheet material, the blade members are preferably arranged such that their leading edge portion in the direction of rotation for securing the fastening portion, is higher than their trailing edge. This is conveniently achieved by shaping the blade members so that their peripheral edge extends substantially along a helical path in a similar manner to a screw propeller. Alternatively or in addition the blade member on its face facing the body 20 may be chamfered along its leading edge portion. The trailing edge portion may be similarly chamfered.

Since the blade members 23, 24 are formed from a resilient plastics material they resiliently urge under their own inherent bias the sheet material into contact with the rear face 20a of the body to thereby positively grip both side faces of the sheet material between themselves and the rear face of the body. The amount of resilience can be varied by altering the thickness of the blade members during manufacture. Thus the degree of resilience may be tailored to suit the sheet material to which the fastening portion is intended to be attached.

It will be appreciated that the blade members 23, 24 may be formed separately from the remainder of the fastening portion so that whilst the blades are made from a resilient material the remainder of the fastening portion may be formed from a different material if desired.

In order to restrain rotation of the body 20 after it has been rotated for securing the fastening portion, location means 40 are preferably provided which cooperate with the sheet material to restrain rotation. In the embodiment illustrated in FIG. 2 the location means 40 is in the form of a projection 42. The projection 42 is intended to be received within an aperture or recess A formed in the sheet material and which has an outline shape corresponding to the outline of the projection 42 as viewed in FIG. 2. In FIG. 2, the projection 42 is located in a recess formed in the edge E of the sheet material. The projection 42 is preferably located adjacent to the blade member 23 so that the sheet material is urged toward the rear face of the body in the region of the projection. In this way the blade member 23 also acts to help maintain engagement of the sheet material with the projection 42. Preferably the projection 42 is also adapted to retain the sheet material in contact with the rear face of the body. In this respect the projection 42 is preferably provided with under cut edges 43 which enable the edge of the sheet material to be pressed passed but then act to restrain lifting movement of the edge of the sheet material away from the rear face of the body 20.

In the embodiment of FIG. 2 the projection 42 is defined by a rib 45 having two enlarged portions 46 provided with the under cut edges 43.

Figure 6:
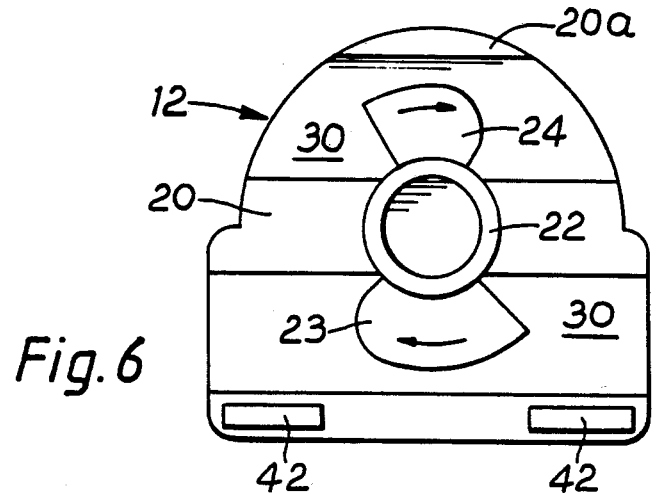
FIG. 6 is a rear view of the anchorage device shown in FIG. 5.

It will be appreciated that the projection 42 may be shaped differently in order to provide the desired function of restraining rotation of the body 20. In the embodiment of FIG. 6 the location means 40 is in the form of two discrete projections 42 each having an under cut edge 43.

In the illustrated embodiment the blade members 23, 24 are of a different size. In this way insertion of the fastening portion into the aperture A is only permitted at one rotational position and thereby ensures that the body only has to be rotated through 90° in order for the location means 40 to engage the co-operating aperture for recess R.

It is envisaged that the number of blade members provided may be varied. For instance the fastening means may only have a single blade member 23, or could have more than two blade members.

Figure 4:
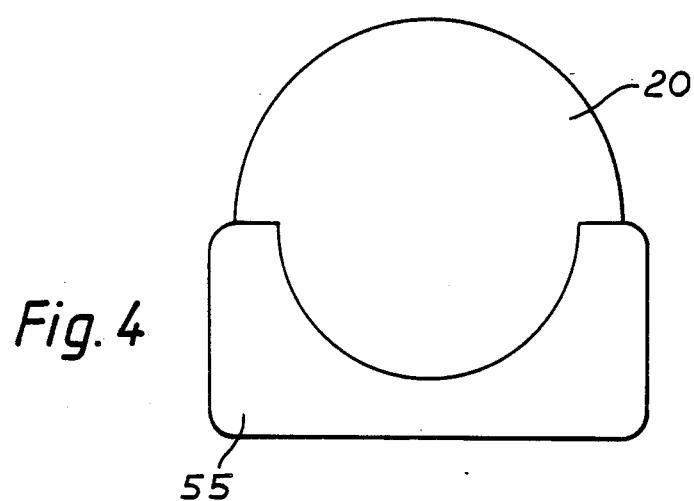
FIG. 4 is a front view of an anchorage device for co-operating with the clasp, the anchorage device having a fastening device according to the present invention.
Figure 5:
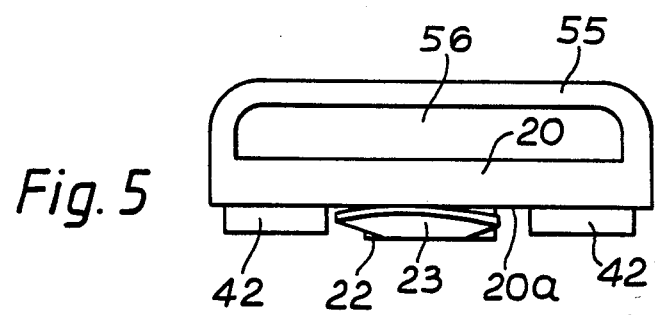
FIG. 5 is a plan view of the anchorage device shown in FIG. 4.

In the drawings, the fastening means are used for attaching a clasp and an anchorage member to a sheet material. Thus in FIGS. 1 to 3, the body 20 has depending therefrom a latch member 50 which is hingedly connected to a surrounding frame 51 which is in turn joined to the body 20. In FIGS. 4 to 6 the body 20 has attached thereto a channel member 55 which defines a bore 56 for receiving the latch member 50.

Figure 7:
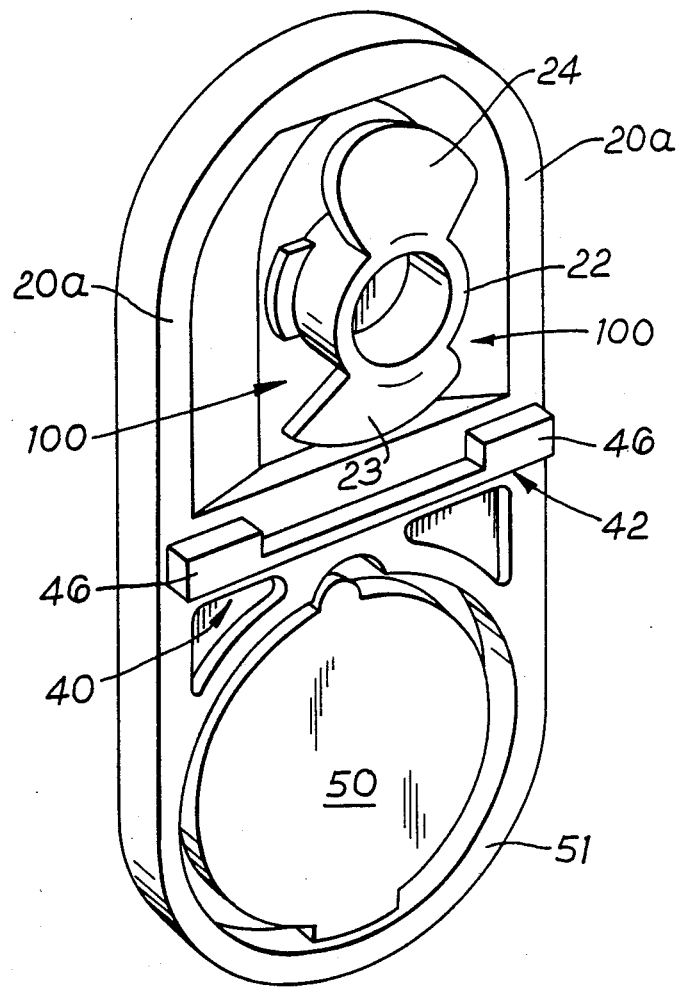
FIG. 7 is a rear perspective view of a modified clasp similar to that shown in FIGS. 1 to 3.

It is envisaged that the pair of grooves 30 may be replaced by a single substantially annular groove located concentrically with the projection 22. An example of this type of fastening means is illustrated in FIG. 7 wherein a single recess 100 is provided. In addition it is also envisaged that the grooves 30 may be omitted such that the rear face of the body 20 is planar and the blade members 23, 24 resiliently urge the sheet material into contact therewith without localised deformation.

The fastening means according to the present invention enable articles to be attached to sheet material in a simple and reliable manner. Thus it is possible for collapsible articles made of sheet material to be supplied without anchilliary articles attached. Thus for example folders can be produced in a flat condition in a state ready for erection and the user can be supplied separately with anchilliary articles for attachment to the folder which includes fastening means according to the present invention. Thus the user has the ability to attach a variety of articles to the sheet material. It is envisaged that the front faces of the body 20 may be provided with an insignia or a separately attachable badge such that the fastening means could be used for attaching insignia or badges to sheet material.

It will be appreciated that the fastening portion can be used for attaching a variety of articles to sheet material by defining a base or anchorage portion for such articles.

It is also envisaged that the fastening means can be used for joining two or more sheets of material together. This is conveniently achieved by appropriately increasing the distance between the blade members and the rear face of the body 20.

Whilst in the illustrated embodiment the blade members have been shown as spaced from the body to define the gap for accommodating the sheet material it is envisaged that prior to entry of the sheet material no gap need be present, for instance the blade members may be in face contact with the body 20.

I claim:

1. A fastening means for attachment to a deformable sheet material, the fastening means comprising a relatively rigid body for location on one side of the sheet material, the body having an abutment face for abutment with said one side of the sheet material, a shaft projection extending from the abutment face and at least one blade member extending radially from the shaft projection with its radially outer tip being located closer to the body than its root, the abutment face having a recess formed therein located beneath each blade member, each blade member being located wholly within the boundaries of the recess located therebeneath, the shaft projection and blade members extending therefrom being arranged for insertion through a similarly shaped aperture formed in the sheet material so that on rotation of the body about the axis of the projection sheet material adjacent said aperture enters between each blade member and the body and is urged by each blade member into the recess located therebeneath to cause the sheet material to deform into the recess and abut against the abutment face bordering said recess and thereby secure the fastening means to the sheet material.

2. A fastening means according to claim 1, wherein the face of the tip of each blade member facing the body is spaced above the bordering abutment face by a distance less than the thickness of the sheet material to which the fastening means is to be attached.

3. A fastening means according to claim 1, wherein the face of the top of each blade member facing the body is located at the same height as the bordering abutment face defining said recess located therebeneath.

4. A fastening device according to claim 1, wherein the periphery edge of each blade member facing the body is spaced below the bordering abutment face defining said recess located therebelow.

5. A fastening means according to claim 1, wherein the peripheral edge of each blade extends generally along a helical path so that the leading edge portion of the blade is located further away from the body than the trailing edge portion.

6. A fastening means according to claim 1, wherein the body is provided with location means which cooperate with the sheet material to restrain rotation of the body after the body has been rotated to secure the fastening means to the sheet material.

7. A fastening means according to claim 6, wherein the location means is located adjacent to said at least one blade member such that said blade member also urges the sheet material into cooperation with the location means.

8. A fastening means for attachment to a sheet material, the fastening means comprising a body for location on one side of the sheet material, a shaft projection extending from the body and at least one blade member extending radially from the shaft projection and being resiliently attached thereto so as to be movable relative to the body to define a gap for reception of the sheet material, each blade member having a peripheral edge which extends generally along a helical path so that the leading edge portion of each blade is located further away from the body than the trailing edge portion, the shaft projection and each blade member extending therefrom being adapted for insertion through a similarly shaped aperture formed in the sheet material so that on rotation of the body about the axis of the shaft projection, sheet material adjacent said apertures enters said gap and is urged by each blade member into contact with the body to thereby secure the fastening means to the sheet material.

* * * * *